United States Patent [19]

Wakabayashi et al.

[11] 4,277,451

[45] Jul. 7, 1981

[54] WET PROCESS FOR THE DESULFURIZATION OF EXHAUST GAS

[75] Inventors: Ataru Wakabayashi, Yokohama; Isao Masuhara, Kawasaki, both of Japan

[73] Assignee: Chiyoda Chemical Engineering & Construction Co., Ltd., Yokohama, Japan

[21] Appl. No.: 103,175

[22] Filed: Dec. 13, 1979

[30] Foreign Application Priority Data

Dec. 20, 1978 [JP] Japan .................................. 53-156255

[51] Int. Cl.$^3$ ............................................. C01B 17/00
[52] U.S. Cl. ..................................... 423/243; 423/242
[58] Field of Search ................ 423/243, 242 A, 242 R

[56] References Cited

U.S. PATENT DOCUMENTS

| | | | |
|---|---|---|---|
| 2,086,379 | 7/1937 | Clark | 423/243 |
| 3,757,488 | 9/1973 | Austin et al. | 423/243 X |
| 3,798,309 | 3/1974 | Knowles et al. | 423/243 |

FOREIGN PATENT DOCUMENTS 478544  1/1938  United Kingdom ..................... 423/243

*Primary Examiner*—O. R. Vertiz
*Assistant Examiner*—Gregory A. Heller
*Attorney, Agent, or Firm*—Frishauf, Holtz, Goodman & Woodward

[57] ABSTRACT

A wet process for the desulfurization of exhaust gas comprising the following operation steps so as to eliminate and recover sulfur dioxide from exhaust gas containing it:

(A) a step of absorbing sulfur dioxide by contacting exhaust gas with an absorbent mainly containing potassium salts of tartaric acid having a pH value of 4.5–6.5, (B) a step of recovering sulfur dioxide by drawing out a part of the absorbent in the step (A) and heating it to liberate and recover sulfur dioxide, (C) a step of circulating the absorbent by cooling the absorbent from the step (B) to a temperature suitable for the absorption of exhaust gas and recycling it to the step (A).

11 Claims, 6 Drawing Figures

WET PROCESS FOR THE DESULFURIZATION OF EXHAUST GAS

BACKGROUND OF THE INVENTION

This invention relates to a process for removing and recovering sulfur dioxide from sulfur dioxide-containing exhaust gas with good efficiency. More particularly, it relates to a wet process for the desulfurization of exhaust gas which comprises contacting the exhaust gas with an absorbent mainly containing potassium salts of tartaric acid to absorb sulfur dioxide in the exhaust gas and then heating the absorbent to recover sulfur dioxide therefrom efficiently and to regenerate it, and finally circulating the absorbent through the absorbing step.

Gas, which is exhausted from various boilers, heating furnace, combustion furnace and the like, contains sulfur dioxide as an air pollutant. In order to prevent air pollution caused by sulfur dioxide, the desulfurization of exhaust gas has been studied and many desulfurizing devices are in operation.

The desulfurization of exhaust gas can be classified generally as a dry process or as a wet process. Recently, the latter is predominantly employed, because it can attain a high desulfurizing rate easily with a compact device. Most of the currently commercialized processes are wet process.

Wet processes are further classified according to the kind of the recovered by-product such as gypsum, sulfur, sulfur dioxide, sodium sulfite, sodium sulfate, ammonium sulfate and the like.

This invention is a wet process for recovering sulfur dioxide among the processes described above.

Various wet processes for desulfurization by recovering concentrated sulfur dioxide from a dilute sulfur dioxide in the exhaust gas, have been proposed. Wellman-Lord's method and the MgO method have been commercially performed. The former method consists of absorbing sulfur dioxide contained in exhaust gas into a solution of sodium sulfite according to the equation (1),

$$Na_2SO_3 + SO_2 + H_2O \rightarrow 2NaHSO_3 \qquad (1)$$

stripping $SO_2$ by heating and concentrating a resulting solution containing $NaHSO_3$ and $Na_2SO_3$ according to the equation (2),

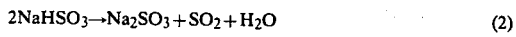

$$2NaHSO_3 \rightarrow Na_2SO_3 + SO_2 + H_2O \qquad (2)$$

recovering the concentrated $SO_2$ gas, dissolving $Na_2SO_3$ precipitated by concentration in water and then circulating it through the absorption system.

The latter method consists of absorbing sulfur dioxide contained in exhaust gas in a slurry of $Mg(OH)_2$ according to the equation (3),

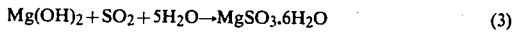

$$Mg(OH)_2 + SO_2 + 5H_2O \rightarrow MgSO_3 \cdot 6H_2O \qquad (3)$$

separating the resulting crystal of $MgSO_3 \cdot 6H_2O$, decomposing it by calcination according to the equation (4),

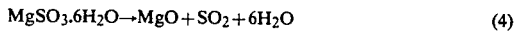

$$MgSO_3 \cdot 6H_2O \rightarrow MgO + SO_2 + 6H_2O \qquad (4)$$

recovering concentrated $SO_2$ and circulating MgO to the absorption system to slake it into $Mg(OH)_2$ which is used again for the desulfurization.

However, the absorbent used in the former method is preferable for the absorption of sulfur dioxide, but not always suitable for its liberation, as the effect of the increase in equilibrium partial pressure of sulfur dioxide by elevation of temperature is small as compared with the other alkali sulfites, and even if the increase in equilibrium partial pressure is promoted by concentrating the absorbent and precipitating some $Na_2SO_3$, the amount of steam which is consumed is still very large. On the other hand, the latter method needs a large amount of fuel for the decomposition of $MgSO_3$ and the evaporation of water of crystallization and adhesive moisture. Therefore, it can not be said that the both methods are efficient, because they consume a large amount of energy for the liberation of sulfur dioxide.

SUMMARY OF THE INVENTION

An object of this invention is to provide a wet process for the desulfurization of exhaust gas, whereby the absorption of sulfur dioxide can be easily effected and its liberation can be carried out with a small amount of energy. This object can be achieved by employing solution or slurry of potassium salts of tartaric acid as an absorbent.

Thus, this invention provides a novel wet process for the desulfurization of exhaust gas, characterized by performing the following operations:

(A) a step of absorbing sulfur dioxide by contacting exhaust gas with an absorbent mainly containing potassium salts of tartaric acid having a pH value of 4.5–6.5, (B) a step of recovering sulfur dioxide by drawing out a part of the absorbent in the step (A) and heating it to liberate and recover sulfur dioxide therefrom, (C) a step of circulating the absorbent by cooling the absorbent from the step (B) to a temperature suitable for the absorption of exhaust gas and recycling it to the step (A).

DETAILED DESCRIPTION OF THE INVENTION

In case of absorbing and eliminating a slight amount of sulfur dioxide contained in a large amount of gas such as exhaust gas of a boiler, the higher the pH value of the absorbent is, the greater the absorbing effect is. The absorbed sulfur dioxide is, however, difficult to be liberated when the pH value of the absorbent is high, whereas the ability of absorbing sulfur dioxide is undesirably lowered when the pH value of the absorbent is low. Therefore, it is generally convenient to employ an absorbent having pH-buffer effect and to use an absorbent at a pH value of about 4.5–6.5 having the ability of absorbing sulfur dioxide and relatively easily liberating sulfur dioxide. However, if the pH value can be kept at a high level during the absorption of sulfur dioxide and at a low level during the liberation of sulfur dioxide, it is apparent that the absorption and liberation of sulfur dioxide will be considerably easily carried out.

Tartaric acid is an organic acid having the pH-buffer effect at pH values within the range from about 2.5 to 4.5 (55° C.). However, the desulfurization of exhaust gas for the recovery of sulfur dioxide within the above pH range is not economical, since sulfur dioxide can be easily liberated, but hardly absorbed.

Figure 1:
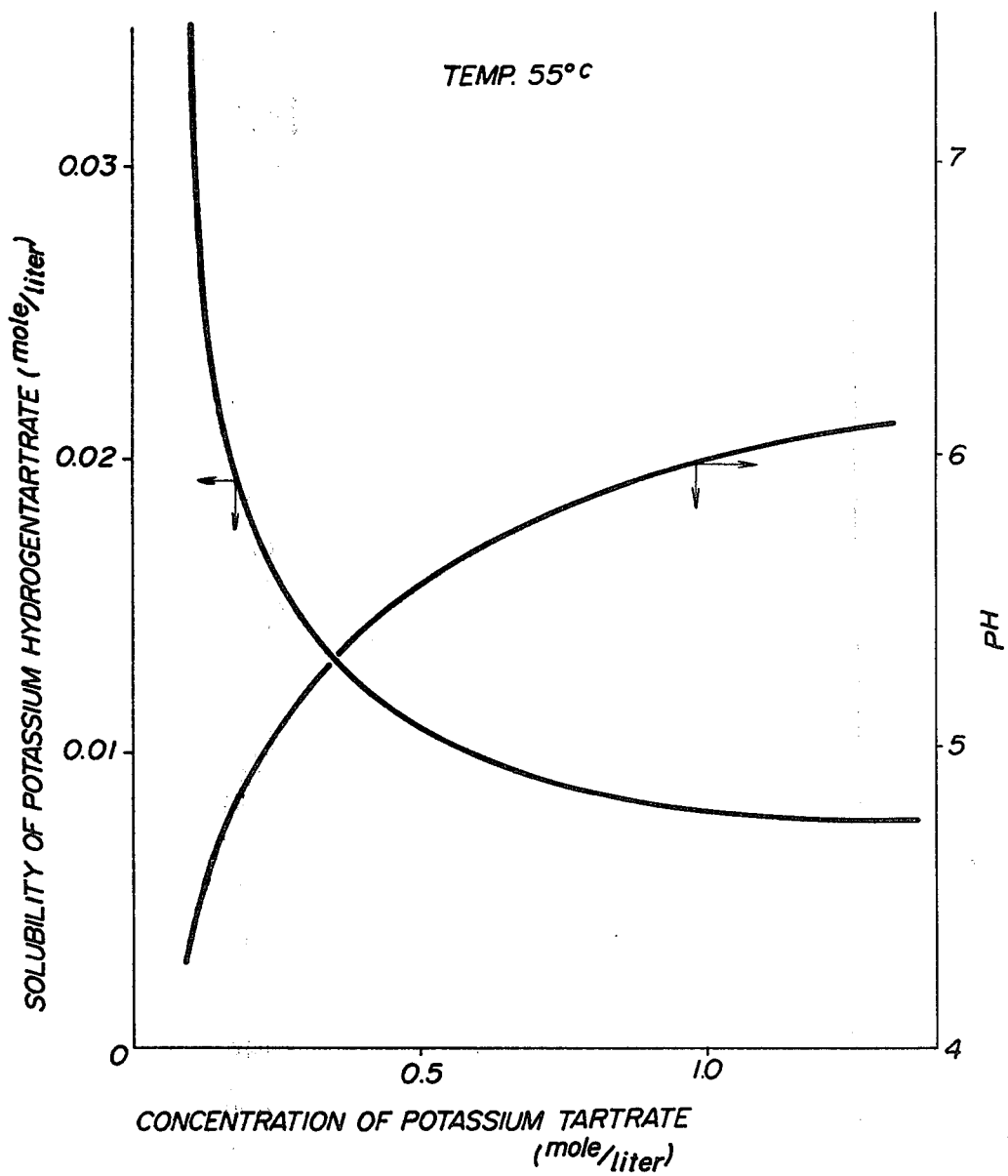
FIG. 1 is a graph showing the relation between concentration of potassium tartrate and solubility of potassium hydrogentartrate as well as the pH value in an absorbent.
Figure 2:
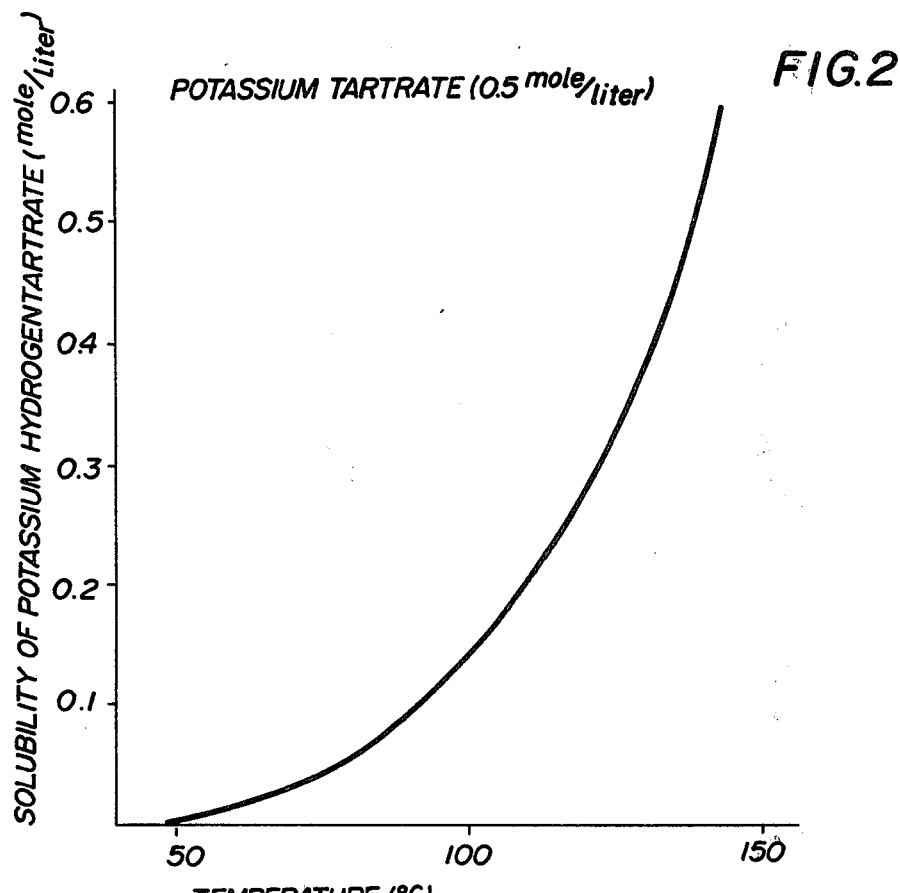
FIG. 2 is a graph showing the relation between the temperature and solubility of potassium hydrogentartrate in an absorbent.

On the other hand, among tartrates, potassium hydrogen-tartrate has a low solubility, for example its solubility in water at 55° C. is about 0.14 mole per liter (mol/l). According to the results of our study, potassium hydrogentartrate shows, in the presence of potassium tartrate, a considerably lowered solubility of about 0.01 mol/l as shown in FIG. 1 due to the effect of the common ion. Furthermore, we have found from our study on influence of temperature of the absorbent that if it is heated for example at 130° C., potassium hydrogentartrate is soluble in an amount of about 0.38 mol/l in the presence of 0.5 mol/l of potassium tartrate as shown in FIG. 2.

This invention has been accomplished on the basis of the recognition mentioned above. Namely, according to this invention, a solution of potassium tartrate having a pH value of 4.5 or above is used as an absorbent and contacted with exhaust gas containing sulfur dioxide at a temperature of 40°–80° C., whereby the absorbent absorbs an acidic gas, i.e. sulfur dioxide, and potassium tartrate is converted into potassium hydrogentartrate as an acidic component according to the equations (5) and (6) described below.

Although it would be considered that the pH value of the absorbent should be considerably lowered because of the production of potassium hydrogentartrate, the pH value of the absorbent is not subjected to wide variation and is kept substantially constant, since the resulting potassium hydrogentartrate is precipitated, instead of being dissolved, in the presence of potassium tartrate. Accordingly, sulfur dioxide can be continuously and efficiently absorbed.

$$K_2C_4H_4O_6 + SO_2 + H_2O \rightarrow KHC_4H_4O_6 + KHSO_3 \quad (5)$$

$$2K_2C_4H_4O_6 + SO_2 + H_2O \rightarrow 2KHC_4H_4O_6 + K_2SO_3 \quad (6)$$

The recovery of sulfur dioxide is carried out by drawing out a part of the absorbent containing solid of potassium hydrogentartrate and then heating it generally at 100°–160° C.

In the continuous operation of both steps of absorbing and recovering sulfur dioxide, the pH value of the absorbent used in the recovering step can be kept at a low level, if potassium hydrogentartrate is added to the absorbent which is circulated between both of the steps. Therefore, according to the invention, a sufficient amount of potassium hydrogentartrate is previously added to the absorbent to form a slurry. Potassium hydrogentartrate is preferably added to the absorbent in an amount calculated from the difference in the solubility of potassium hydrogentartrate caused by the temperature difference between the absorbing step and the recovering step or in a greater amount. In the recovering step, since solid potassium hydrogentartrate is dissolved in the absorbent during elevation of the temperature by heating, the pH value can be kept at low level, and the equilibrium partial pressure of sulfur dioxide can be increased in cooperation with the effect of temperature, so that the recovery of sulfur dioxide can be very easily and efficiently carried out.

The absorbent is returned to the absorbing step after liberating sulfur dioxide so as to form a circulation system and to allow continuous operation. Before returning the absorbent to the absorbing step, it is cooled to a temperature suitable for the operation in the absorbing step. On cooling the absorbent in such a manner as described above, potassium hydrogentartrate is again precipitated in an amount corresponding to the difference in solubility at the respective temperatures and the pH of the absorbent is elevated: namely the ability to absorb of sulfur dioxide is reactivated. When sulfur dioxide is absorbed according to this invention, potassium hydrogensulfite and potassium sulfite may be produced as by-product as shown in the equations (5) and (6). The presence of these substances may elevate the partial pressure of sulfur dioxide in the recovering step of sulfur dioxide. In order to give such effect fully, it is desirable that these substances are usually in an amount of about 0.1–2.0 mol/l, though their amount may very depending on a pH value of the absorbent.

In the prior art process for the liberation and recovery of sulfur dioxide, in general, when heating the absorbent, a part of the sulfite ions undergo self-redox reaction to produce mainly thiosulfate ions. Therefore, the absorbent should be more or less discharged, in order to prevent the accumulation of thiosulfate ions. This discharge results in loss of the absorbent in the process using phosphate or other salts of organic acids, said process is proposed as the wet process for the desulfurization of exhaust gas.

On the contrary, since potassium tartrate used in this invention can be recovered as the potassium hydrogentartrate by adding an acid, loss of the absorbent by discharge can be substantially prevented.

Furthermore, a part of the sulfite is oxidized by oxygen contained in the exhaust gas in the absorbing step according to the conventional wet process to produce a sulfate, which can not be regenerated. Above all, the oxidation is promoted by the catalytic action of a small amount of metal ions such as Fe, Ni and the like and therefore, a large amount of alkali is lost. Contrary to this, the tartrate used in this invention forms complexes with various metal ions having the catalytic effect on the oxidation of the sulfite, whereby the oxidation can be prevented and the loss of alkali can be decreased.

Though the pH value of the absorbent fed to the step of absorbing sulfur dioxide is determined by concentration of sulfur dioxide in the exhaust gas, percentage of the attained desulfurization, temperature of the absorbent and the like, it may vary generally within the range from 4.5 to 6.5 and is controlled by the concentration of potassium tartrate in the absorbent. Practically, the concentration of potassium tartrate in the absorbent should be at least 0.1 mole per liter, and may vary within the range from 0.1 mol/l to the saturation and is preferably 0.5 mol/l or above so as to give enough effect described above.

This invention will be further detailed with reference to the following examples, in which data and other figures are not restrictive of this invention.

Figure 3:
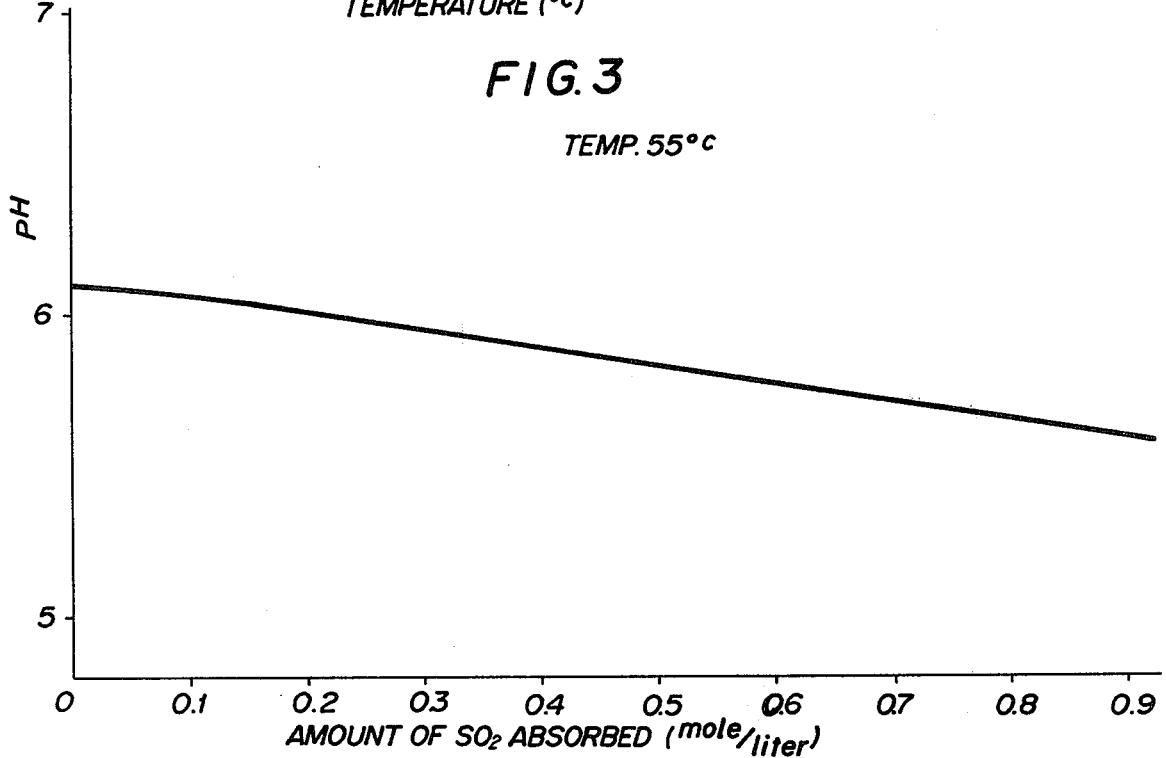
FIG. 3 is a graph showing the relation between the amount of absorbed $SO_2$ and pH.

FIG. 3 shows the variation of pH values, when sulfur dioxide is absorbed at 55° C. in an absorbent containing 1.3 mol/l of potassium tartrate, 0.008 mol/l of potassium hydrogentartrate, 0.08 mol/l of potassium sulfite and 0.52 mol/l of potassium hydrogensulfite and having a pH value of 6.1 (55° C.). For example, when 0.8 mol/l of sulfur dioxide at 55° C. is absorbed in a slurry containing solid potassium hydrogentartrate in an amount corresponding to 0.38 mol/l in the absorbent described above, the composition of the resulting absorbent having a pH of 5.6 is 0.523 mol/l of potassium tartrate, 0.01 mol/l of potassium hydrogentartrate, 0.06 mol/l of potassium sulfite, 1.34 mol/l of potassium hydrogensulfite and 1.16 mol/l of potassium hydrogentartrate solid, and the equilibrium vapor pressure of sulfur dioxide is 500 ppmv at 55° C. When the absorbent is heated at 130° C. in order to recover the absorbed sulfur dioxide, the equilibrium vapor pressure of sulfur dioxide is 400,000 ppmv which corresponds to 800 times when compared with that of the absorbing step. On carrying out additional stripping with steam at 130° C. in a vapor-liquid counter current contact, the obtained stripping gas contains $H_2O$ and $SO_2$ in a rate of 2.5:1 by weight. Since this ratio is 7–9:1 according to the already industrialized Wellman-Lord method, the amount of consumed steam is apparently decreased according to this invention. The composition of the absorbent at 130° C., from which sulfur dioxide has been recovered, is 1.36 mol/l of potassium tartrate, 0.348 mol/l of potassium hydrogentartrate and 0.6 mol/l of potassium hydrogensufite. On cooling this absorbent to 55° C. in order to reuse it for the absorption of sulfur dioxide, the solid of potassium hydrogentartrate is precipitated in an amount of 0.38 mol per liter of the absorbent. Namely, the absorbent has a pH value of 6.1 and is reactivated its ability of absorbing sulfur dioxide.

Figure 4:
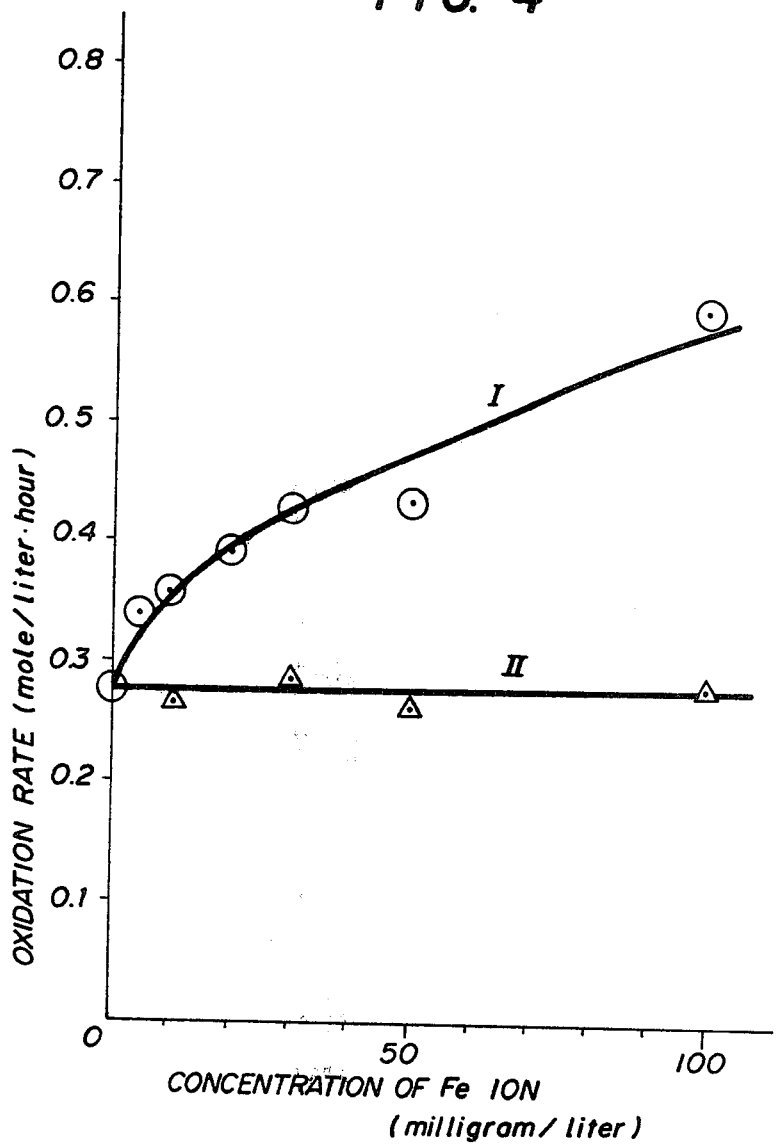
FIG. 4 is a graph showing effects of a tartrate on the oxidation of a sulfite in the presence of Fe-ion catalyst.

FIG. 4 shows the oxidation rate, when Fe ions are added to a solution (I) containing 1 mol/l of potassium sulfite and 1 mol/l of potassium hydrogensulfite and the oxidation is carried out with air at 55° C. in a bubbling tower, and when the procedure is carried out in a similar manner as described above with a solution (II) containing additionally 0.1 mol/l of potassium tartrate in the solution (I) as described above. As shown in FIG. 4, the tartrate can prevent the catalytic action of Fe ions.

Figure 5:
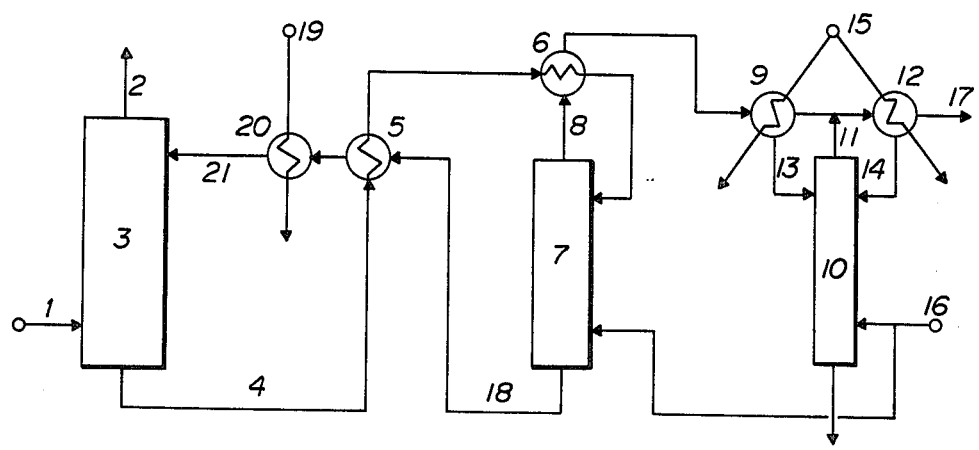
FIGS. 5 and 6 are flowsheets of the examples of the invention.
Figure 6:
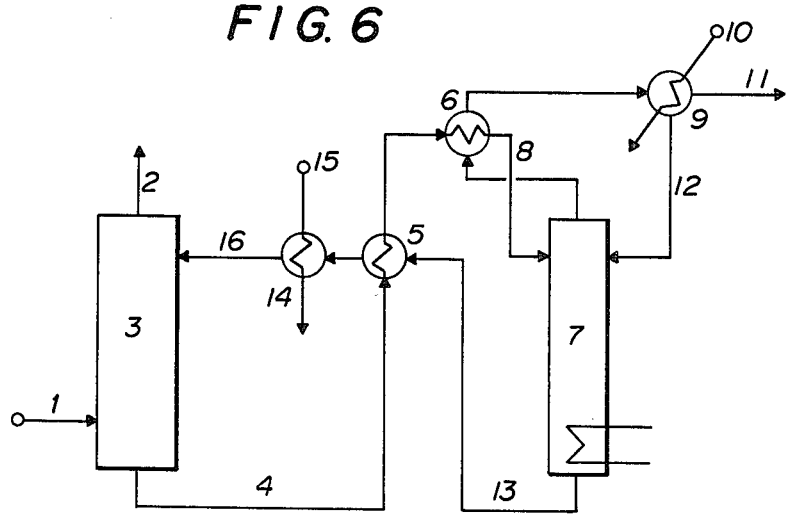

FIGS. 5 and 6 show flowsheets of the embodiments of this invention. One embodiment of this invention is illustrated in FIG. 5, wherein a gas containing sulfur dioxide is introduced into an absorbing tower 3 through a pipe 1 and contacted with a solution of potassium tartrate containing solid of potassium hydrogentartrate fed from a pipe 21. After absorbing and eliminating sulfur dioxide, the gas is discharged into air. The slurry containing sulfur dioxide and solid of potassium hydrogentartrate precipitated is drawn out through a pipe 4, heated by heat exchangers 5 and 6 to a predetermined temperature for recovering sulfur dioxide and then delivered to a sulfur dioxide stripper 7. Sulfur dioxide is stripped by steam fed from a pipe 16 in the stripper 7 and taken out through a pipe 8, and coexisting steam is separated by condensation by means of heat exchangers 6, 9 and 12. The thus obtained, highly concentrated sulfur dioxide is fed to a reservoir through a pipe 17. On the other hand, sulfur dioxide contained in the condensate drawn out from the heat exchangers 9 and 12 is fed to a stripper 10 through pipes 13 and 14. After subjecting a stripping, sulfur dioxide is returned to the heat exchanger 12 through a pipe 11, and the condensate is discharged from the bottom of the stripper 10 to the outside of the system. The solution, from which sulfur dioxide is eliminated in the stripper 7, is fed to the heat exchangers 5 and 20 through a pipe 18, and then cooled to a temperature suitable for the absorption step to precipitate potassium hydrogentartrate, and thereafter is circulated to the absorbing tower through a pipe 21.

FIG. 6 shows the substantially same embodiment as in FIG. 5. In FIG. 5, the stripping of sulfur dioxide is carried out by direct blowing of steam, whereas in FIG. 6 it is carried out by means of a reboiler mounted below the stripper 7. The employment of either the direct blowing of steam or the reboiler can be selected under consideration of design requirements and the like in each case.

What is claimed is:
1. A cyclic wet process for desulfurization of exhaust gas which contains sulfur dioxide, which comprises the following operation steps to remove and recover sulfur dioxide from said exhaust gas:
   (A) contacting exhaust gas with an absorbent comprising potassium salts of tartaric acid having a pH of 4.5–6.5 to absorb sulfur dioxide from said exhaust gas at a temperature below about 80° C. at which potassium hydrogentartrate is formed and precipitates as a solid,
   (B) removing a portion of the absorbent from step (A) which contains the absorbed sulfur dioxide and heating it to liberate and recover sulfur dioxide therefrom, and
   (C) cooling the absorbent from the step (B) from which the sulfur dioxide has been removed to a temperature suitable for the absorption of sulfur dioxide from the exhaust gas and recycling it to the step (A).

2. The process according to claim 1, wherein said absorbent used in step (A) contains potassium hydrogentartrate in an amount at least equal to the difference between its solubility at the temperature of the absorbing step (A) and the recovering step (B).

3. The process according to claim 1 or 2, wherein the concentration of potassium tartrate in the absorbent is at least 0.1 mole per liter.

4. The process according to claim 1 or 2, wherein the temperature when the absorbent is contacted with the exhaust gas is from 40° C. to 80° C.

5. The process according to claim 3, wherein the temperature when the absorbent is contacted with the exhaust gas is from 40° C. to 80° C.

6. The process according to claim 1 or 2, wherein the absorbent drawn out from step (B) is heated at a temperature of from 100° C. to 160° C. in order to liberate sulfur dioxide.

7. The process according to claim 3, wherein the absorbent drawn out from step (B) is heated at a temperature of from 100° C. to 160° C. in order to liberate sulfur dioxide.

8. The process according to claim 4, wherein the absorbent drawn out from step (B) is heated at a temperature of from 100° C. to 160° C. in order to liberate sulfur dioxide.

9. The process according to claim 1 or 2, wherein the concentration of potassium tartrate in the absorbent is at least 0.5 mole per liter.

10. The process according to claim 6, wherein the concentration of potassium tartrate in the absorbent is at least 0.5 mole per liter.

11. The process according to claim 8, wherein the concentration of potassium tartrate in the absorbent is at least 0.5 mole per liter.

* * * * *